(No Model.)  5 Sheets—Sheet 1.
G. R. HILDYARD.
PROCESS OF AND APPARATUS FOR PRODUCING DESIGNS UPON PAPER OR OTHER SURFACES.
No. 537,923. Patented Apr. 23, 1895.
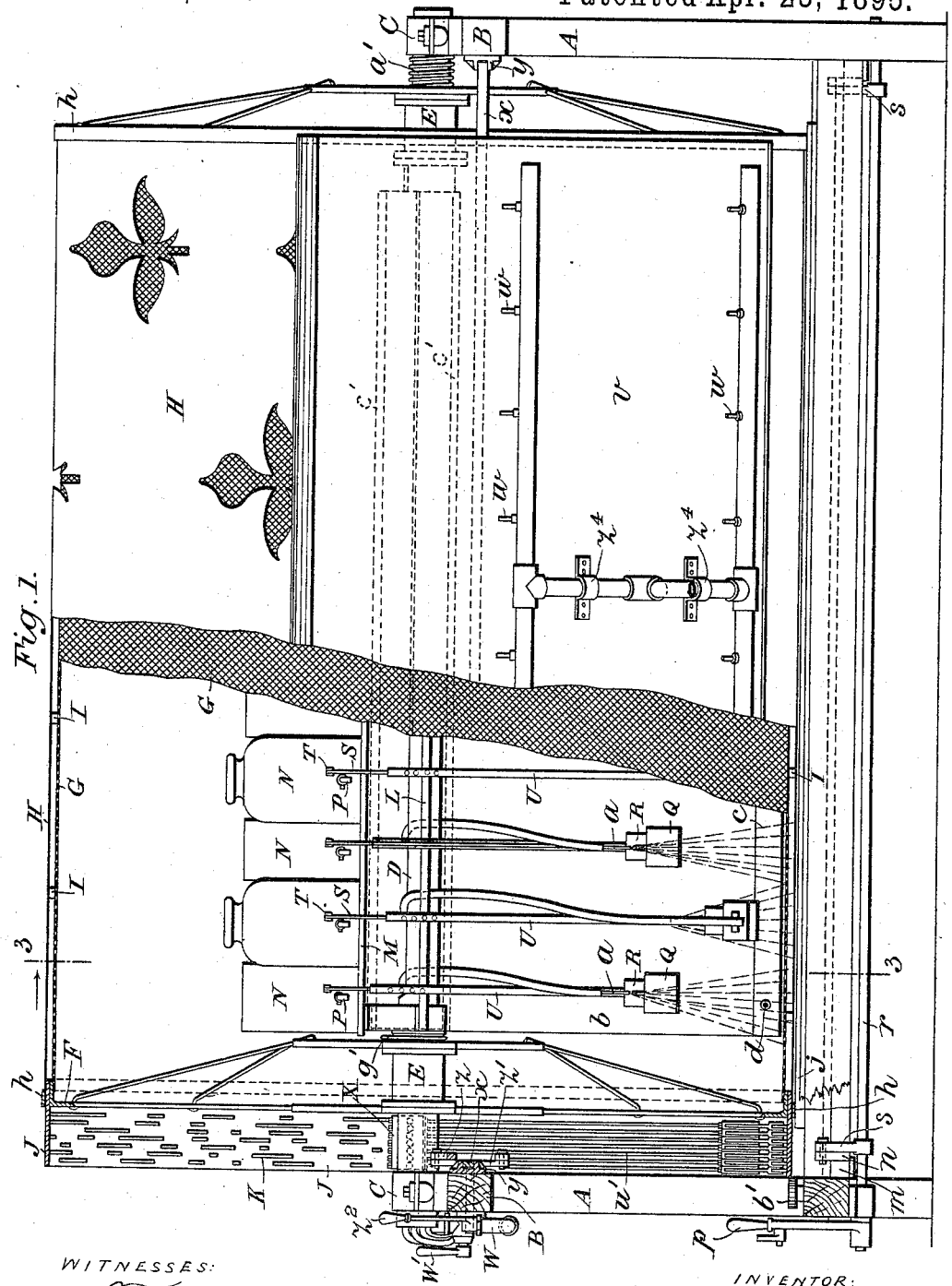

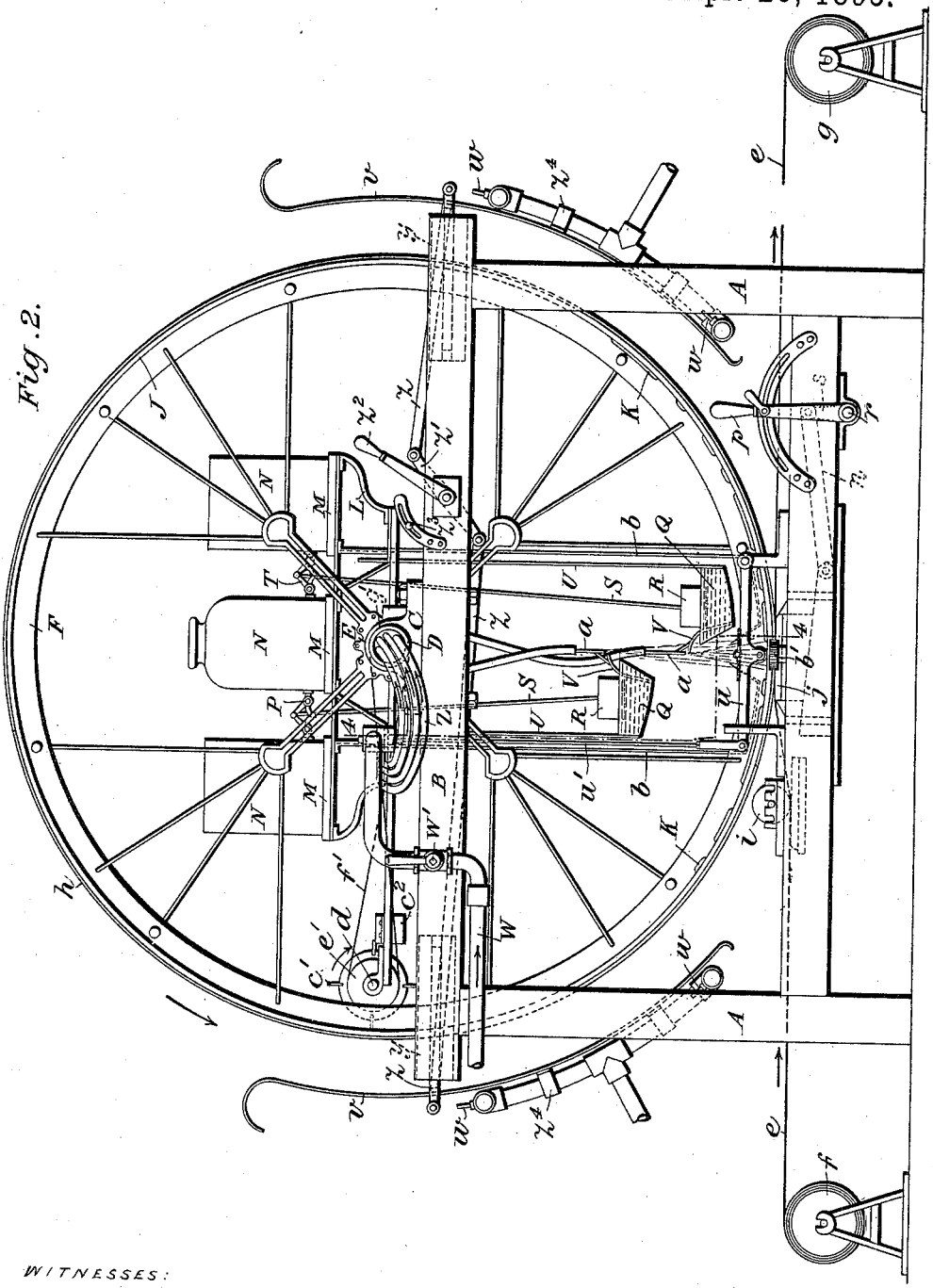

(No Model.)
G. R. HILDYARD.
PROCESS OF AND APPARATUS FOR PRODUCING DESIGNS UPON PAPER OR OTHER SURFACES.
No. 537,923. Patented Apr. 23, 1895.
5 Sheets—Sheet 3.
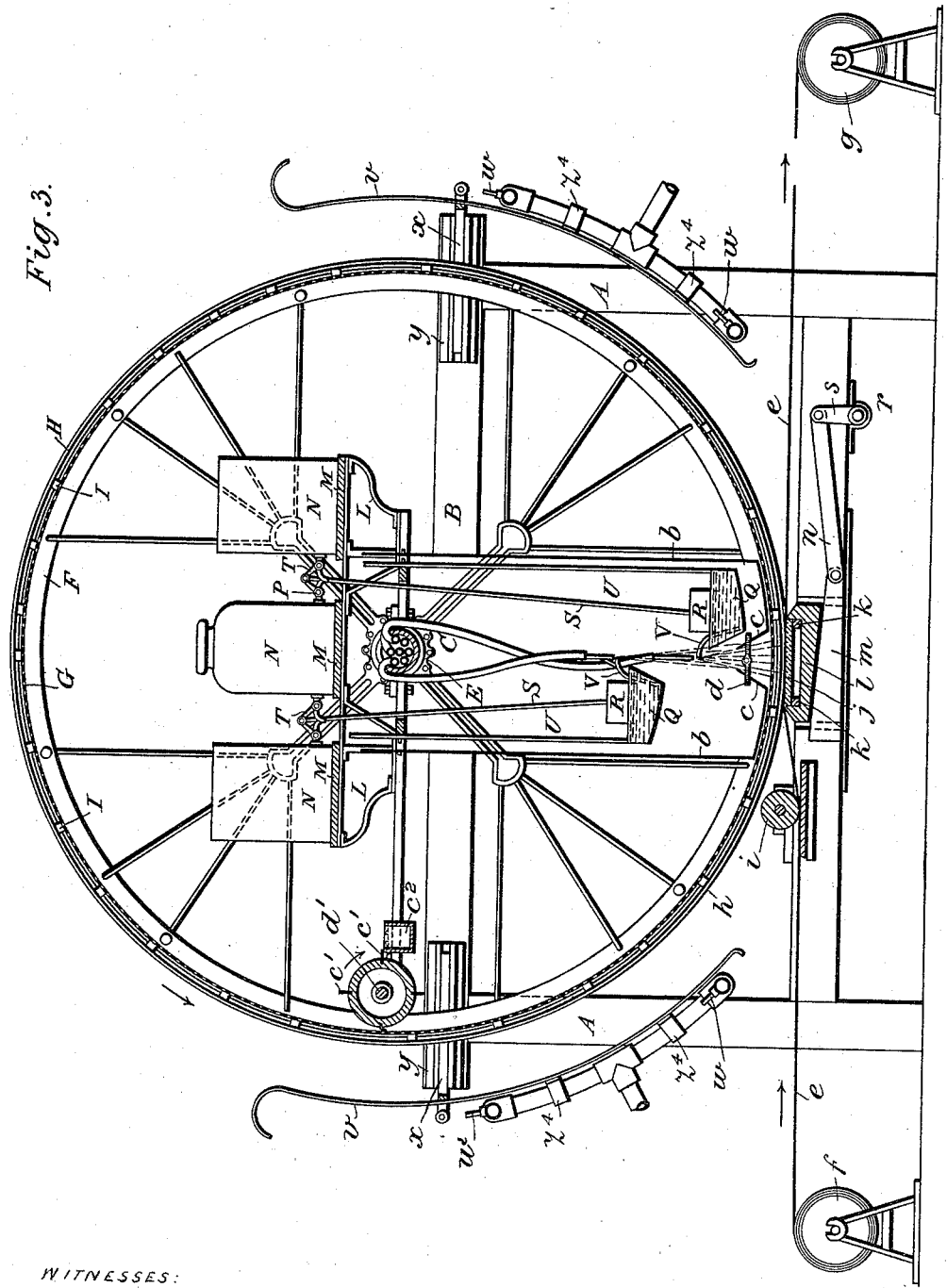
WITNESSES:
Fred White
Thomas F. Wallace
INVENTOR:
George Richard Hildyard,
By his Attorneys
Arthur E. Fraser & Co (No Model.) 5 Sheets—Sheet 4.
G. R. HILDYARD.
PROCESS OF AND APPARATUS FOR PRODUCING DESIGNS UPON PAPER OR OTHER SURFACES.
No. 537,923. Patented Apr. 23, 1895.
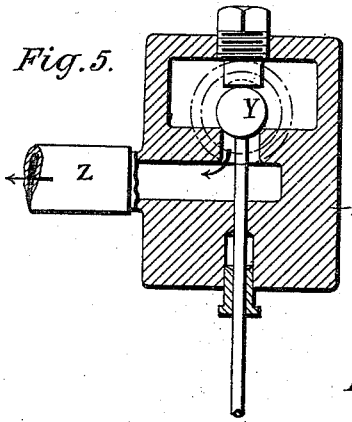
Fig. 5.
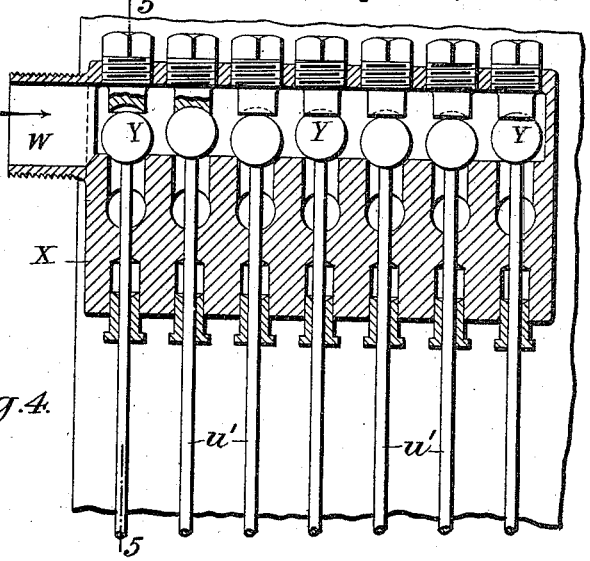
Fig. 4.
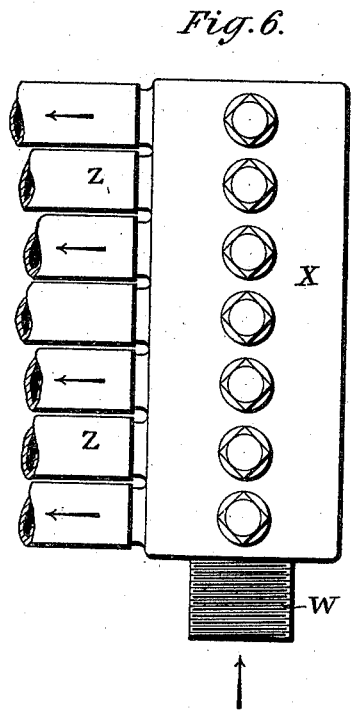
Fig. 6.
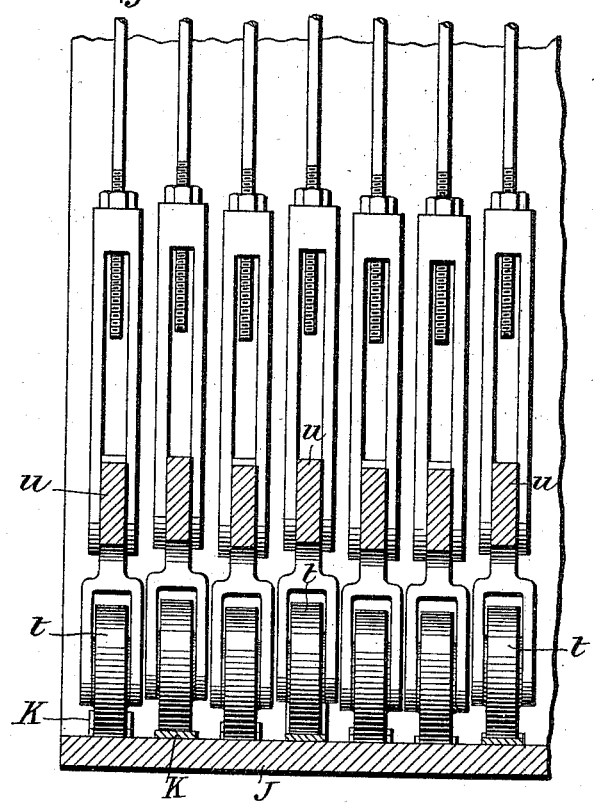
WITNESSES:
Fred White
Thomas F. Wallace
INVENTOR:
George Richard Hildyard,
By his Attorneys
Arthur G. Fraser & Co (No Model.) 5 Sheets—Sheet 5.
G. R. HILDYARD.
PROCESS OF AND APPARATUS FOR PRODUCING DESIGNS UPON PAPER OR OTHER SURFACES.
No. 537,923. Patented Apr. 23, 1895.
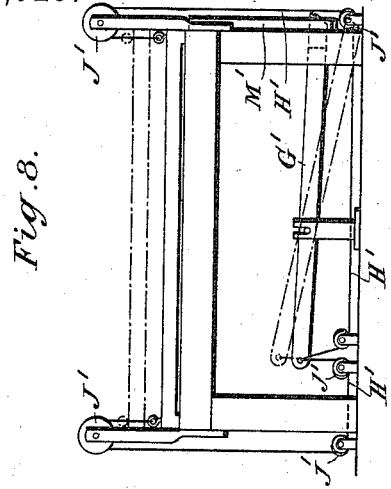
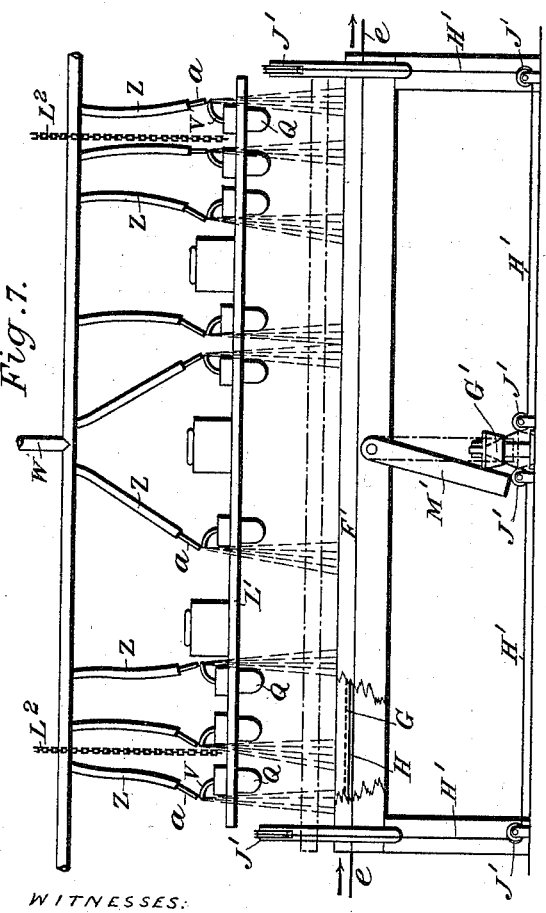
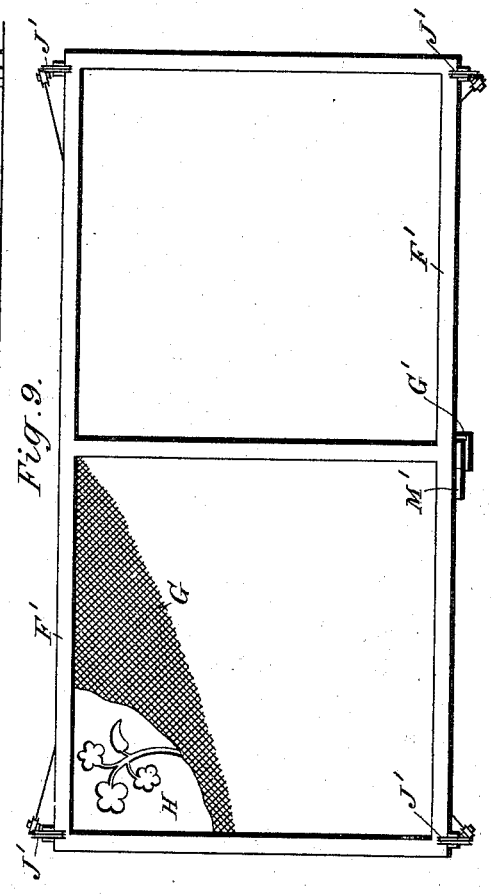
WITNESSES:
Fred White
Thomas F. Wallace
INVENTOR:
George Richard Hildyard,
By his Attorneys
Arthur C. Fraser & Co.

United States Patent Office.

GEORGE RICHARD HILDYARD, OF LONDON, ENGLAND.

PROCESS OF AND APPARATUS FOR PRODUCING DESIGNS UPON PAPER OR OTHER SURFACES.

SPECIFICATION forming part of Letters Patent No. 537,923, dated April 23, 1895.

Application filed December 18, 1894. Serial No. 532,135. (No model.)

*To all whom it may concern:*

Be it known that I, GEORGE RICHARD HILDYARD, of London, England, have invented certain new and useful Improvements in Processes of and Apparatus for Producing Designs upon Paper or other Surfaces, specially applicable to the production of posters, showcards, and the like, of which the following is a specification.

The objects of my invention are the economical production of designs upon paper or other surfaces without the use of printing presses as hitherto employed; also to enable a number of colors that may be required in the design to be applied to the paper or other surface during one passage through the apparatus; and further to produce designs when desired upon sheets or surfaces of much larger dimensions than the largest that the presses hitherto used have been able to print upon.

My invention consists of a process or mode of producing designs upon paper or other surface which process or mode consists in applying inks or colors to the said surface in the state of very fine division and either in a liquid form as spray or in a dry form as powder, the said spray or powder being caused to pass to the said surface first through a net or gauze of textile material or metal and then through a stenciled sheet in which the pattern or form of the required design has been cut.

The invention also includes the means and apparatus for carrying out the said process or mode. The said means or apparatus will be fully understood from the description hereinafter contained.

In the accompanying drawings,—Figure 1 is a side elevation of an apparatus constructed for the pupose of my invention in its preferred form, part of the stencilled sheet and of the gauze being shown as broken away to allow the interior of the apparatus to be seen. Fig. 2 is an end elevation of the same apparatus. Fig. 3 is a section on the line 3—3 of Fig. 1. Fig. 4 is a section on a larger scale on the line 4—4 of Fig. 2. Fig. 5 is a section on the line 5—5 of Fig. 4. Fig. 6 is a plan of the valve box and of part of the blast pipes. Fig. 7 shows in elevation partly sectional a modified construction of the apparatus. Fig. 8 is a side elevation of the same, but without the blast pipes and color bottles; and Fig. 9 is a plan of the same also without the blast pipes and color bottles, and with part of the gauze broken away to expose a portion of the stenciled sheet below.

Referring first to Figs. 1 to 6, A A are uprights supporting at each end of the apparatus a transverse beam or bar B on which beams are brackets C C carrying the ends of a fixed longitudinal bar D. This bar is tubular, but has a longitudinal opening along the top for the greater part of its length for the purpose hereinafter mentioned. This bar forms the bearings for the naves or bosses E E of two wheels F F one at each end of the apparatus. Between the two wheels and secured thereto is a cylinder G formed of a fine net or gauze of fine textile or other material and outside this cylinder is another cylinder H consisting of a stenciled sheet in which the pattern or form of the required design is cut.

The cylinders G and H are kept at a suitable distance apart, say half an inch more or less, by means of distance pieces I I of wood or other suitable material cemented to both the cylinders. These distance pieces also serve to hold in place any portions of the stenciled sheet which the stenciling disconnects from the body of the sheet.

The two wheels F F, gauze cylinder G and stencil cylinder H together form a drum. Extending from one end of this drum and forming a longitudinal continuation thereof is a ring J fixed to the adjoining wheel F. This ring has secured to its inner face a number of tappets or projecting pieces K K of leather or other suitable material for the purpose hereinafter described.

Fixed to the longitudinal bar D are brackets L supporting shelves M M on which the color reservoirs or vessels N N are placed. The number of color reservoirs is variable and they may be arranged in three rows as shown or otherwise. The particular colors contained in the various reservoirs or in other words the relative positions of the reservoirs containing the various colors will be varied as required according to the design to be produced. Each of the reservoirs is shown as provided with a cock or faucet P the mouth of which is in the same vertical line as a color vessel Q below, so that the liquid color which runs from the faucet P drops into the corresponding vessel Q. In the vessel Q is a float R connected with the faucet P by a rod S and lever T, so that the faucet is closed or more or less opened according to the height of the float R as determined by the liquid level in the vessel Q. This vessel is thus automatically supplied with color from the corresponding reservoir N and the level of the color maintained practically uniform. The vessels Q are carried by bars U attached to the brackets L. Each vessel Q is fitted with an outlet pipe V from which the liquid color contained therein is drawn as hereinafter described.

W is a main blast pipe having a cock W' and supplied with air, steam or other fluid under pressure. The fluid employed is preferably air forced by any suitable blower. The blast pipe W leads to a valve box X containing as many valves Y (see Figs. 4 and 5) as the maximum number of colors required for the design to be produced. The drawings show the apparatus as fitted with seven valves. From the box X at each valve Y is carried a blast pipe Z and all the seven pipes are preferably carried as shown in Figs. 1 and 2 through the open end of the tubular bar D and then along this bar to the particular positions where they are respectively required, and their ends are carried over the open top of the bar D and then in a downward direction. These blast pipes Z will each have as many branches as there may be reservoirs N of the particular color allotted to each blast pipe and all the branches will be led to the positions in which they are respectively required to act. Every blast pipe Z or branch blast pipe is fitted with a nozzle $a$ placed in such position relatively to the outlet pipe V of a corresponding color vessel Q that when the blast pipe is open to the valve box X it blows across the end of this pipe and thereby draws the liquid color from the vessel Q by induction. The blast meeting the stream of liquid color issuing from the pipe V reduces it to the state of spray or fine division and blows it in this state through the gauze G below, in passing through which the blast of coloring matter is modified so that the color is more evenly distributed while any incompletely atomized particles are further reduced. The color then passes through the stenciling or openings of the stenciled sheet H upon the paper or other material upon which the design has to be produced, the said paper or material being caused to travel under the stencil cylinder as hereinafter described.

$b\ b$ are two guards extending along the apparatus within the cylinder to protect the colors from external currents and $c\ c$ are two longitudinal flaps attached to said guards, the distance between the flaps determining the width of gauze exposed at one time to the blast. This distance is preferably adjustable, for which purpose the flaps are hinged to the guards $b\ b$ and fitted with right and left handed screws $d$.

$e$ is the paper or other material upon which the design is to be produced. It is unwound from a roll $f$ and after receiving the design is wound upon a roller $g$ caused to revolve in any suitable way. Between the rolls $f$ and $g$ it passes under the drum consisting of the wheels F F, gauze cylinder G and stencil cylinder H, and in passing under this drum it imparts rotation thereto by frictional contact with rings or bands $h\ h$ of india rubber or other suitable elastic or yielding material fitted around the respective ends of the said drum. During every rotation of the drum a complete repeat of the design is produced or for small work more than one such repeat may be produced. The paper on its way from the roll $f$ passes under a guide roller $i$ and then over a bed or plate $j$ of glass or other suitable material which not only serves to support it and prevent it sagging, but also keeps it well in contact with the india rubber rings $h\ h$. The bed $j$ is supported on blocks $k$ of wood or other suitable material in a frame $l$ the under side of which is inclined and is supported by an inclined slide $m$ below. When it is required to release the paper from the rings $h\ h$ or to pass the leading end of the roll of paper under these rings and stencil sheet at starting, the slide $m$ is pushed partly from under the frame $l$ by means of the connecting bars $n\ n$ which are worked by a lever handle $p$ through the intermediation of a longitudinal rod $r$ and arms $s\ s$.

The valves Y Y when not opened close by gravity. They are opened at the appropriate times by means of the tappets K already described on the inside of the ring J. There are as many circular rows of tappets as there are valves, that is to say seven in the arrangement shown. Every tappet K in each circular row, as the ring J revolves with the stencil cylinder, comes in turn in contact with an anti-friction roller $t$ (see Fig. 4) carried by a lever $u$ connected to a vertical rod $u'$ at the upper end of which is the spherical valve Y. The tappet K lifts the roller $t$, rod $u$ and valve Y and keeps them lifted and the valve is therefore opened until the tappet has passed the roller. The roller $t$, rod $u$ and valve Y then descend by gravity and the valve closes. In Fig. 4 three of the seven valves are by way of example shown open by the action of the corresponding tappets.

It will of course be understood that the number, length and relative positions of the tappets in each circular row will be governed by the design to be produced, that is to say wherever red color is required in the design the valve that controls the blast for distributing color from the vessels Q containing the red color must be opened. The positions of the tappets will in fact be planned for each design on somewhat the same principle as the holes in the cards used in Jacquard mechanism.

The operation of the apparatus will be understood from the description already hereinbefore contained, but may shortly be described as follows: The requisite color reservoirs N having been placed in the proper positions, the required number of blast pipes Z having been placed with their nozzles $a$ in the proper position relatively to the outlet pipes V of the vessels and the paper $e$ having been led under the stencil cylinder and its leading end secured to the wind-up roller $g$ and the paper lifted by means of the slide $m$ into contact with the india rubber rings $h\,h$, the paper is caused to travel by winding it up on the roller $g$ and the drum comprising the wheels F F, gauze cylinder G and stencil cylinder H with the ring J at the same surface speed as the paper. The tappets K K of each circular row in turn open the corresponding valve Y and again allow it to close. Every time and so long as a valve Y is open the blast from the main W passes through the valve into the corresponding blast pipe Z and its branches, and issuing from the nozzles $a$ at the ends of these branches draws up the liquid color through the outlet pipes V of the corresponding color vessels Q and reduces the color to the state of spray, blowing this spray through the gauze G and stencil sheet H upon the paper $e$ traveling below.

In order to dry the color that remains on the stencil cylinder the apparatus is provided, preferably at both sides as shown, with a plate $v$ heated by gas jets $w\,w$. The plates $v\,v$ when the apparatus is at work should be placed as close as practicable to the stencil cylinder, but when the apparatus is stopped they should be moved out into the position shown in the figures so as to avoid scorching the stencil sheet. In order to move them from their outer to their inner position and vice versa each plate $v$ carries slides $x$ working in guides $y$, these slides being connected by means of rods $z$ to a lever $z'$ operated by a handle $z^2$ so that this handle moves both of the plates $v$ in and out simultaneously. The inward movement is limited by an adjustable stop $z^3$ against which the handle abuts. The gas pipes move inward and outward with the plates $v\,v$, being attached thereto by straps or bands $z^4$.

In order to steady the wheels F F, gauze cylinder G and stencil cylinder H in their rotation a spring $a'$ is fitted around the bar D as seen at the right hand of Fig. 1, so as to press against the outer side of the nave E at that end and push the nave at the opposite end against the side of its bearing. An antifriction roller $b'$ against which the ring J bears at this end eases the rotary movement.

As it is desirable to remove surplus color from the inside of the gauze cylinder G, a series of wipers $c'\,c'$ is employed carried by a shaft $d'$ which is driven by means of a pulley $e'$ and belt $f'$ from a pulley $g'$ on one of the naves E. These wipers rotate in the opposite direction to the gauze cylinder and in contact therewith, and are cleaned as they revolve by coming in contact with the upper edge of a longitudinal duct or trough $c^2$.

As the stencil sheet is not subject to any rough wear it can be made of a thin material such for example as paper in which very fine work can be stenciled, the paper being coated with a shellac varnish or other like material on the face next the gauze after the stencil has been cut out. These thin sheets become strengthened by use through the deposit of the colors thereon.

Instead of using liquid colors I can use colors in the state of powder in which case the reservoirs N will not be required, as the powders will be supplied direct to the vessels Q and the paper or other material on which the design is to be produced will be coated with varnish which is still in a moist or tacky condition when the powders are applied thereto.

I will now describe the modification shown in Figs. 7, 8 and 9. In this modification the gauze G and stencil sheet H are flat instead of being cylindrical, as in the construction shown in Figs. 1 to 6, and they are held in a horizontal frame F' which is lowered upon the paper $e$ while the colors are being distributed upon the latter through the said gauze and stencil sheet, and is raised from the paper $e$ to enable this to be moved forward. The paper $e$ is fed intermittently, being wound from a roll such as $f$ (Figs. 2 and 3) and taken up by a roller such as $g$ (Figs. 2 and 3). At each intermittent feed a fresh length of the paper equal to the length of the frame F' is brought under the stencil sheet H. The design is then produced thereon by the application of colors in the state of fine division as hereinbefore described. W is the main blast pipe; Z Z, the branch blast pipes with nozzles $a$; Q, the color vessels with outlet pipes V and supported by a holder L', which is itself suspended by chains L². The frame F' with the gauze G and stencil sheet H, is lifted when required by means of a treadle G' to the inner end of which are connected cords or straps H'. These cords pass over guide pulleys J' J' and are connected respectively to the four corners of the frame F' so that when the outer end of the treadle G' is depressed the cords H' lift the frame F' into the position indicated in dotted lines in Figs. 7 and 8. M' is a swing stop which normally occupies the inclined position seen in Fig. 7, but which when the treadle is depressed is moved into the vertical position indicated in dots and then holds the treadle down and consequently keeps the frame F' in the raised position.

What I claim, and desire to secure by Letters Patent, is—

1. The improved process of stenciling designs by a blast of coloring matter in a state of fine division, which consists in projecting a blast of coloring matter in a finely divided state toward a surface to be ornamented, modifying the blast of coloring matter by reducing it to a state of finer division while in transit, and arresting the blast of coloring matter where the nature of the design requires, substantially as set forth.

2. In apparatus for producing designs upon paper or other surface, the combination of a stencil sheet cut with the pattern of the required design, a gauze sheet parallel with but not in contact with said stencil sheet, vessels for holding and delivering the inks or colors for producing said design, and blast apparatus for blowing the inks or colors in a state of very fine division through said gauze sheet and through said stencil sheet so that said inks or colors come in contact with the paper or other surface and produce the design thereon, substantially as set forth.

3. In apparatus for producing designs upon paper or other surface, a stencil sheet cut with the pattern of the required design, a gauze sheet parallel with said stencil sheet, and distance pieces between said sheets, said pieces serving both to maintain said sheets at the required distance apart and also to hold up any detached pieces of the stencil sheet substantially as and for the purpose set forth.

4. In apparatus for producing designs upon paper or other surface, the combination of a stencil cylinder cut with the pattern of the required design, a gauze cylinder within said stencil cylinder and concentric but not in contact therewith, means of imparting rotation to said stencil and gauze cylinders at the same surface speed as the paper or other surface, vessels for holding and delivering the inks or colors for producing said design, blast apparatus for blowing the inks or colors in a state of very fine division through said gauze and stencil cylinders and means of moving the paper or other surface in face of said stencil cylinder so that said inks or colors after passing through the stencil cylinder are received on said surface and produce the design thereon, substantially as set forth.

5. In apparatus for producing designs upon paper or other surface, the combination of a stencil cylinder cut with the pattern of the required design, a gauze cylinder within said stencil cylinder and concentric but not in contact therewith, means of imparting rotation to said stencil and gauze cylinders at the same surface speed as the paper or other surface, vessels for holding and delivering the inks or colors for producing said design, blast apparatus for blowing the inks or colors in a state of very fine division through said gauze and stencil cylinders, valves controlling the blast through the various pipes of the blast apparatus, means of moving the paper or other surface in face of said stencil cylinder and a ring concentric with and revolving with said stencil cylinder and carrying tappets for operating the respective valves at the times the corresponding blast pipes have to act in accordance with the exigencies of the design to be produced, substantially as and for the purpose set forth.

6. In apparatus for producing designs upon paper or other surface, the combination of the stencil cylinder H cut with the pattern of the required design, the gauze cylinder G within said cylinder H and concentric but not in contact therewith, means of imparting rotation to said cylinders H and G at the same surface speed as the paper or other surface, ink or color vessels Q, outlet pipes V to said vessels, main blast pipe W, valve box X, blast pipes Z, valves Y to said blast pipes Z, nozzles $a$ on these blast pipes co-acting with said outlet pipes V, means of operating said valves and means of moving the paper or other surface upon which the design has to be produced in face of said stencil cylinder all substantially as and for the purpose set forth.

7. In apparatus for producing designs on a surface, the combination with a stencil sheet cut with the pattern of the required design, and a blast apparatus blowing coloring matter in a finely divided state through said stencil sheet against said surface, of a gauze sheet in the path of the coloring matter blown from said apparatus, through which gauze sheet said coloring matter passes before reaching said surface, substantially as and for the purpose set forth.

8. In a stenciling machine, a rotary stencil cylinder, in combination with a movable heater therefor disposed adjacent to the surface thereof, and movable toward and from such surface, and means connected to and moving said heater, whereby by adjusting the position of said heater the heating of said surface can be regulated.

9. The combination with the rotary stencil cylinder H, of the heating plate $v$ having its inner side opposed to said cylinder, a heater heating said plate, disposed at the outer side thereof, and means moving said plate and heater toward and from said stencil cylinder, whereby the heat from said heater is transmitted through said plate to said cylinder, and by moving said plate and heater the degree of heat transmitted can be varied, substantially as and for the purpose set forth.

10. In a stenciling machine, a rotary stencil cylinder, a rotary gauze cylinder therein, and means supplying coloring matter at the inner side of said gauze cylinder, in combination with a wiper for cleaning said gauze cylinder, disposed within the latter and engaging and wiping the inner surface thereof as said gauze cylinder rotates.

11. The combination with the rotary stencil cylinder H, and rotary gauze cylinder G therein, of a rotary wiper $c'$ within and wiping the inner surface of said gauze cylinder, and duct $c^2$ within said gauze cylinder and in the path of rotation of said wiper, whereby the latter rubs on said duct as it rotates and it is cleaned thereby, substantially as and for the purpose set forth.

12. The combination with the rotary stencil cylinder H and wheels F F carrying said cylinder, of the bands $h\,h$ around said wheels for bearing upon and receiving rotary motion from the traveling paper or other surface $e$, bed $j$ for supporting said paper or surface while moving under said cylinder H, and means of raising and lowering said bed, all substantially as and for the purpose set forth.

In witness whereof I have hereunto signed my name in the presence of two subscribing witnesses.

GEORGE RICHARD HILDYARD.

Witnesses:
 GEORGE C. BACON,
 ROBERT M. SPEARPOINT.